United States Patent
Klimer et al.

(10) Patent No.: US 12,541,565 B1
(45) Date of Patent: Feb. 3, 2026

(54) TECHNIQUES FOR NAVIGATION HISTORY GENERATION

(71) Applicant: Rubrik, Inc., Palo Alto, CA (US)

(72) Inventors: Oded Klimer, San Jose, CA (US); Mukul Chandra Singh Bisht, Saratoga, CA (US); Vinay Ramanand Gangoli, Karnataka (IN); Phani Srinath Priyatham Adigopula, Karnataka (IN); Van Nguyen Avon, Palo Alto, CA (US); Anam Bhatia, San Jose, CA (US); Santosh S, Karnataka (IN); Khitish Agrawalla, Karnataka (IN)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 18/898,422

(22) Filed: Sep. 26, 2024

(51) Int. Cl.
*G06F 16/957* (2019.01)
*G06F 16/23* (2019.01)
*G06F 16/954* (2019.01)
*G06F 16/955* (2019.01)

(52) U.S. Cl.
CPC ...... *G06F 16/9574* (2019.01); *G06F 16/2379* (2019.01); *G06F 16/954* (2019.01); *G06F 16/9566* (2019.01)

(58) Field of Classification Search
CPC ............. G06F 16/9574; G06F 16/9566; G06F 16/954; G06F 16/2379
See application file for complete search history.

(56) References Cited

U.S. PATENT DOCUMENTS

| | | | | |
|---|---|---|---|---|
| 8,402,359 | B1* | 3/2013 | Pogodin | G06F 16/955 |
| | | | | 715/810 |
| 2009/0070392 | A1* | 3/2009 | Le Roy | G06F 16/958 |
| | | | | 707/999.203 |
| 2010/0017756 | A1* | 1/2010 | Wassom, Jr. | G06F 11/0709 |
| | | | | 715/854 |
| 2017/0337163 | A1* | 11/2017 | Burkard | G06F 40/134 |
| 2022/0092145 | A1* | 3/2022 | Childress | G06F 9/547 |
| 2023/0137417 | A1* | 5/2023 | Tiwari | G06F 16/9566 |
| | | | | 726/6 |
| 2024/0152987 | A1* | 5/2024 | Sharpe | G06Q 30/0629 |
| 2024/0311436 | A1* | 9/2024 | Peng | G06F 16/9562 |

* cited by examiner

*Primary Examiner* — Huawen A Peng
(74) *Attorney, Agent, or Firm* — Holland & Hart LLP

(57) ABSTRACT

Methods, systems, and devices for data management are described. A data management system (DMS) may load a first uniform resource locator for a webpage configured for an application, where the webpage includes a set of elements associated with the application and one or more filters corresponding to the set of elements. The DMS may update a navigation history list to include a first entry corresponding to the first uniform resource locator. The DMS may then receive a selection to apply a filter from the one or more filters to at least one element from the set of elements, and load a second uniform resource locator for the webpage based on receiving the selection to apply the filter. The DMS may then update the navigation history list to replace the first entry with a second entry corresponding to the second uniform resource locator based on receiving the selection.

18 Claims, 11 Drawing Sheets

TECHNIQUES FOR NAVIGATION HISTORY GENERATION

FIELD OF TECHNOLOGY

The present disclosure relates generally to data management, including techniques for navigation history generation.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Some data management systems (DMSs) may support users interacting with enterprise applications along with web applications. Often, users may lose track of their navigation history within a web application. This issue may be particularly prevalent in some applications (e.g., banking applications), where browser history may not be maintained seamlessly. In such cases, users may be discouraged from using the web browser's back button as it may potentially disrupt the website's functionality. In some instances, if a user navigates back to a prior web page, there may not be a functionality of the navigation history tracker to keep track of the current web page (the web page from which the user navigated to the prior web page). Additionally, a navigation history of web applications may not provide for selective history tracking. This type of navigation history may impact user experience.

Aspects of the present disclosure provide for a navigation history component included in an application, which tracks and displays up to a threshold quantity of most-recent pages (e.g., last 20 pages). The most recent pages may correspond to the pages that a user visits within a single tab and active session. In some examples, a user may use the navigation history component to navigate back to any of these pages, with the history persisting even if the user navigates back to a previous page. In particular, the navigation history component may provide for selectively excluding one or more pages from the navigation history (e.g., pre-login or post-login campaign-type pages). This ensures that the navigation history is more relevant and useful to the user. Additionally, the entries in the navigation history list generated by the navigation history component may be unique based on their route's pathname and by eliminating duplicate entries. This may make the navigation history more concise and easier to navigate for a user. The navigation history component may retain the history even if the user navigates back to a previous page (e.g., if a user navigates from webpage A to webpage B back to webpage A, the navigation history component retains the entire history instead of retaining history relating to the most recent navigation to webpage A). Additionally, or alternatively, the navigation history component may maintain one or more filter states for a webpage (e.g., in a webpage prior to navigating away). Thus, the navigation history component described in the present disclosure may provide for seamless navigation for a user and enhances user experience.

Figure 1:
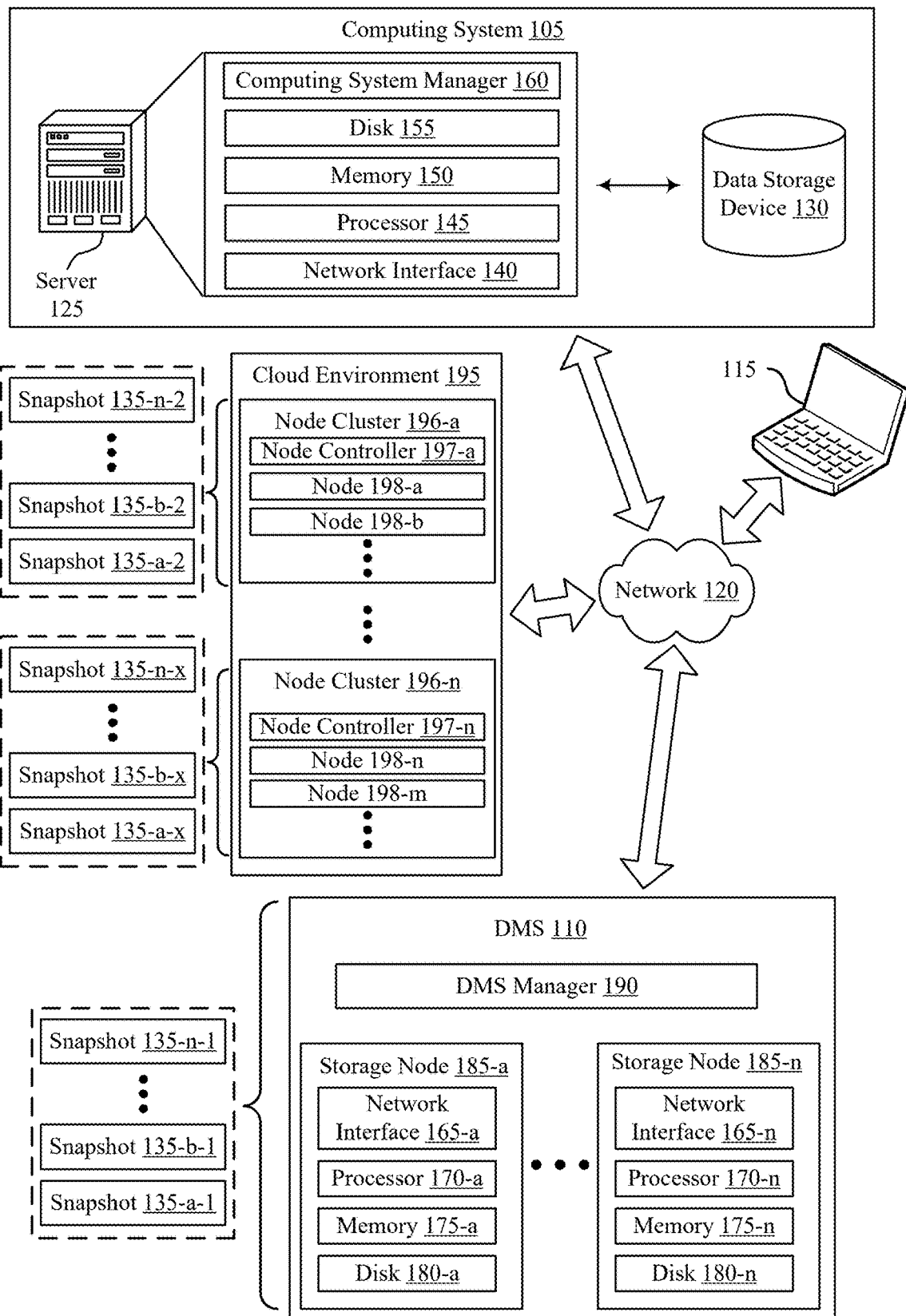
FIG. 1 illustrates an example of a computing environment that supports techniques for navigation history generation in accordance with aspects of the present disclosure.

FIG. 1 illustrates an example of a computing environment 100 that supports techniques for navigation history generation in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. In some cases, a computing object that is the subject of a snapshot 135 may be or include a collection of multiple objects (e.g., computing objects may have hierarchical relationships, with lower-level computing objects included within one or more higher-level computing objects). For example, a filesystem may include multiple files, and along with the filesystem being a computing object, the files therein may also be computing objects. Or, as another example, a database may include multiple tables, and along with the database being a computing object, the tables therein may also be computing objects. Thus, a snapshot may be of one or more computing objects, and a snapshot of a first computing object (e.g., a higher-level computing object) may also be a snapshot of each computing object (e.g., each lower-level computing object) that is included in (e.g., is a member or component of) the first computing object. Additionally, a snapshot may be of one or more lower-level computing objects individually (e.g., a snapshot of a lower-level computing object may be separate from another snapshot of another lower-level computing object, separate from another snapshot of a higher-level computing object that contains the lower-level computing object, or both).

A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. A base snapshot 135 may alternatively be referred to as a full snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a base snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a base snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-a may be associated with the first customer or tenant associated with the computing system 105. The DMS 110 may obtain (e.g., generate or receive) and transfer the snapshots 135 associated with the computing system 105 to the node cluster 196-a in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-n in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

The computing system 105 may utilize techniques depicted in the present disclosure for navigation history generation. According to one or more aspects depicted herein, the DMS 110 may load, in a user interface of an application program, a first uniform resource locator for a webpage configured for an application. In some examples, the webpage may include a set of elements associated with the application and one or more filters corresponding to the set of elements. The DMS 110 may update a navigation history list to include a first entry corresponding to the first uniform resource locator. In some cases, the first entry may be based on a hierarchical location of the first uniform resource locator. The DMS 110 may receive, via a user input in the user interface, a selection to apply a filter from the one or more filters to at least one element from the set of elements. The DMS 110 may then load, in the user interface of the application program, a second uniform resource locator for the webpage based on receiving the selection to apply the filter. The DMS 110 may update the navigation history list to replace the first entry with a second entry corresponding to the second uniform resource locator based on receiving the selection to apply the filter to the at least one element from the set of elements.

Figure 2:
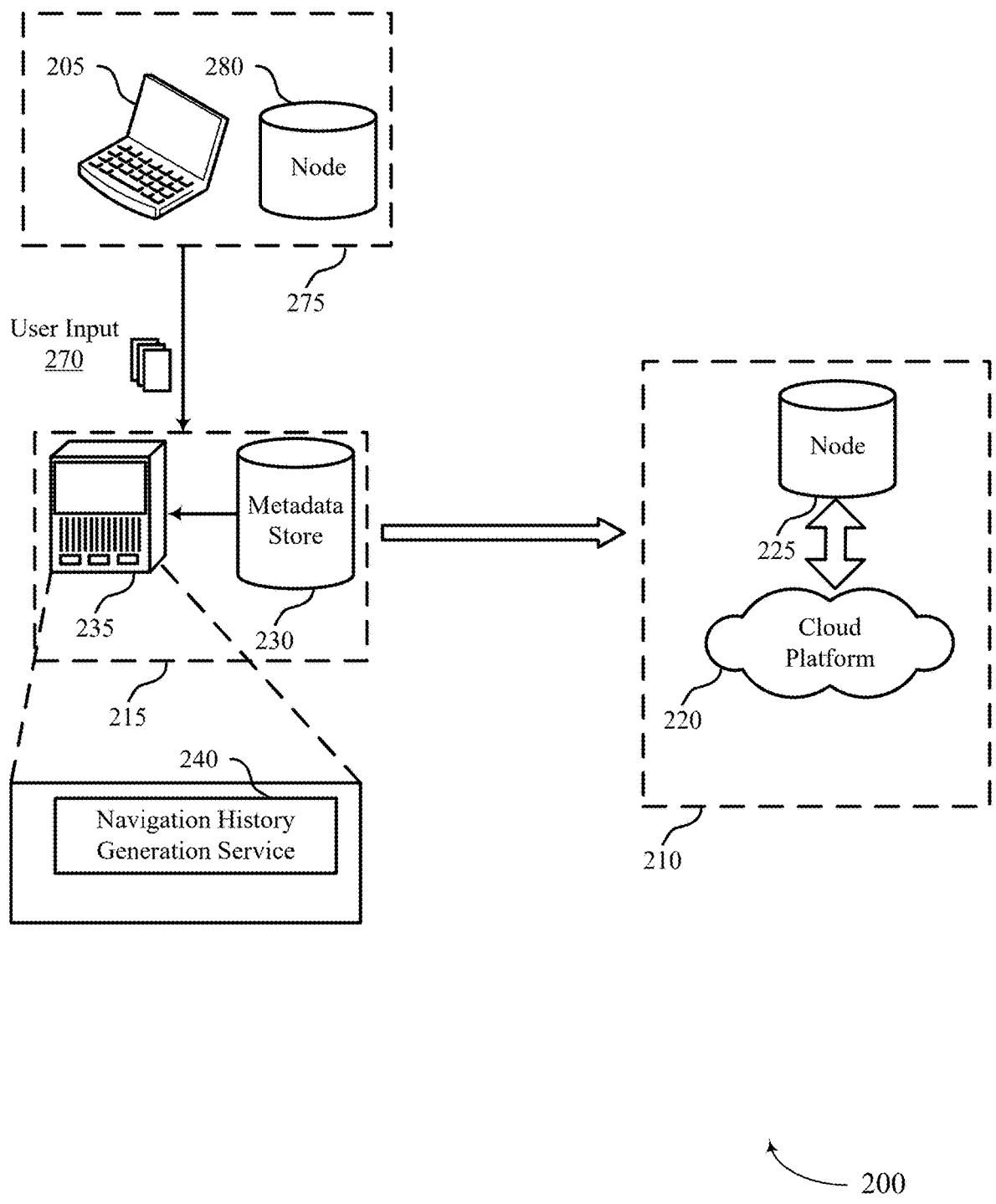
FIG. 2 shows an example of a computing system that supports techniques for navigation history generation in accordance with aspects of the present disclosure.

FIG. 2 shows an example of a computing system 200 that supports techniques for navigation history generation in accordance with aspects of the present disclosure. The computing system 200 includes a user device 205, a data center 210 and a data manager 215. The user device 205 may be an example of a device described with reference to FIG. 1. The user device 205 may also be an example of a cloud client. A cloud client may access data sources using a network connection. The network may implement transfer control protocol and internet protocol (TCP/IP), such as the Internet, or may implement other network protocols. The user device 205 may be an example of a user device, such as a server, a smartphone, or a laptop. In other examples, a user device 205 may be a desktop computer, a tablet, a sensor, or another computing device or system capable of generating, analyzing, transmitting, or receiving communications. In some examples, the user device 205 may be operated by a user that is part of a business, an enterprise, a non-profit, a startup, or any other organization type.

The data center 210 may include a computing node 225. Although not depicted herein, the data center 210 may include more than one computing node 225. As depicted in the example of FIG. 2, the data center 210 may include a cloud platform 220. The cloud platform 220 may offer an on-demand storage, backup and computing services to the user device 205. In some cases, the data center 210 may be an example of a storage system with built-in data management. The data center 210 may serve multiple users with a single instance of software. However, other types of systems may be implemented, including—but not limited to—client-server systems, mobile device systems, and mobile network systems. The data manager 215 may be an example of an integrated data management and storage system. The data manager 215 may include a metadata store 230 and an application server 235. The metadata store 230 and the application server 235 may collectively represent a unified storage system even though numerous storage nodes may be connected together and the number of connected storage nodes may change over time as storage nodes are added to or removed. The data manager 215 may also be an example of a cloud-based storage and an on-demand computing platform.

As depicted herein, the computing system 200 may support an integrated data management and storage system and may be configured to manage the automated storage, backup, deduplication, replication, recovery, and archival of data within and across physical and virtual computing environments. The computing system 200 including an integrated data management and storage system may provide a unified primary and secondary storage system with built-in data management that may be used as both a backup storage system and a "live" primary storage system for primary workloads. In some cases, the integrated data management and storage system may manage dynamic versions when performing data storage. In some examples, the computing system 200 may provide backup of data (e.g., one or more files) using parallelized workloads, where the data may reside on virtual machines and/or real machines (e.g., a hardware server, a laptop, a tablet computer, a smartphone, or a mobile computing device).

According to aspects depicted herein, the computing system 200 supports backup management for data sources. In some examples, the data manager 215 may receive a request to recover a set of data items from a data backup environment to a data source environment 275. In the example of FIG. 2, the data source environment 275 may include a user device 205 and a database node 280. Additionally, the data backup environment may include data center 210.

The data manager 215 may support a navigation history generation service 240. In particular, the techniques depicted herein may provide for a navigation history generation to address the problem of users losing track of their navigation history within a web application. In some examples, users browsing a web application (e.g., banking application) on a browser may be discouraged from using the browser's back button due to potential disruptions to the website's functionality. To seamlessly generate and maintain navigation history, the navigation history generation service 240 may track and display a threshold quantity of webpages (e.g., up to the last 20 pages) that a user visits within a single tab and active session. The user may use the navigation history generation service 240 to navigate back to one or more webpages visited by the user. In such examples, the navigation history generation service 240 may maintain navigation history even if the user navigates back to a previous page.

According to one or more aspects of the present disclosure, the data manager 215 may provide for loading, in a user interface of an application program (e.g., application program displayed on user device 205), a first uniform resource locator for a webpage configured for an application. In some examples, the webpage may include a set of elements associated with the application and one or more filters corresponding to the set of elements. For instance, the set of elements may refer to one or more menu items for a webpage. The one or more filters may refer to one or more values for the one or more menu items for the webpage. In some examples, upon loading (or receiving an indication that a user has loaded) the first uniform resource locator for the webpage, the data manager 215 may update a navigation history list to include a first entry corresponding to the first uniform resource locator. In some examples, the first entry may be based on a hierarchical location of the first uniform resource locator. The data manager 215 may receive information related to the hierarchical location of the first uniform resource locator from the metadata store 230.

In some examples, the navigation history generation service 240 may provide for maintaining a unique entry based on a route's pathname. In particular, the navigation history generation service 240 may ensure that entries in the navigation history list are unique based on their route's pathname, thereby eliminating duplicate entries and making the navigation history more concise and easier to navigate. In some examples, the data manager 215 may provide for loading, in the user interface of the application program, a second uniform resource locator for the webpage based on receiving the selection to apply the filter. For example, the data manager 215 may receive a user input 270 (via user device 205) that includes a selection of a filter of the one or more filters in the previously loaded webpage. The user input 270 may indicate a selection of a value for a menu item included in the webpage associated with the first uniform resource locator. The data manager 215 may update the navigation history list to replace the first entry with a second entry corresponding to the second uniform resource locator based on receiving the selection to apply the filter to the at least one element from the set of elements.

In some examples, the navigation history generation service 240 may provide for selective history tracking. For example, the navigation history generation service 240 may selectively exclude certain pages from the navigation history (such as pre-login or post-login campaign-type pages). This ensures that the navigation history is more relevant and useful to the user. In some examples, the data manager 215 may load, in the user interface of the application program, a third uniform resource locator for the webpage. In some cases, the third uniform resource locator may correspond to a list of excluded webpages. In such cases, the data manager 215 may refrain from updating the navigation history list with a third entry corresponding to the third uniform resource locator based on the third uniform resource locator corresponding to the list of excluded webpages. The list of excluded webpages may include at least one of a pre-login page, a post-login page, or a campaign page.

In some examples, the navigation history generation service 240 may provide for maintaining persistent history after navigation. The data manager 215 may retain a navigation history even if a user navigates back to a previous page. In some examples, a most recently clicked entry may be moved to the first position in the list, pushing the later entries back, but not removing them. This may provide for a more comprehensive and accurate representation of the user's navigation path. In some cases, the data manager 215 may provide for loading, in the user interface of the application program, a third uniform resource locator for the webpage. The data manager 215 may then update the navigation history list to include a third entry corresponding to the third uniform resource locator. In some examples, the third entry may be based on a hierarchical location of the third uniform resource locator.

Additionally, or alternatively, the navigation history generation service 240 may provide for reloading, in the user interface of the application program, the second uniform resource locator for the webpage after loading the third uniform resource locator for the webpage. The navigation history generation service 240 may then update the navigation history list to update a positioning of the third entry and the second entry based on reloading the second uniform resource locator for the webpage.

In some examples, the data manager 215 may maintain one or more filter states associated with the uniform resource locator. If a newly loaded uniform resource locator differs from the previously loaded uniform resource locator, in terms of query parameters (which may represent filter states), then the previous uniform resource locator may be replaced instead of adding a new one to the list. This may ensure that the navigation history reflects the latest filter states, providing for a more accurate and context-aware navigation history. For instance, based on loading the third unform resource locator, the data manager 215 may determine that second entry and the third entry are duplicate entries. In such cases, updating the navigation history list may include updating the navigation history list to replace the second entry with the third entry. Alternatively, the second entry and the third entry may be unique entries.

In some examples, the data manager 215 may determine that the navigation history list includes a threshold quantity of entries. In such cases, the data manager 215 may delete a previous entry from the navigation history list prior to including the third entry corresponding to the third uniform resource locator based on determining that the navigation history list includes the threshold quantity of entries. For example, the data manager 215 may maintain a list of 20 items in the navigation history list. In response to loading a new uniform resource locator, the data manager 215 may determine whether adding the new uniform resource locator would increase the size of the navigation history list. In such cases, the data manager 215 may delete a previous entry from the navigation history list prior to adding the new entry corresponding to the new uniform resource locator.

In some examples, the data manager 215 may implement the navigation history generation service 240 using a centralized data storage, a history listener, and a data collection and storage infrastructure. The centralized data storage may maintain a consistent state across different components. This store may export one or more functionalities to implement the navigation history generation service 240. In some examples, the history listener may be included or implemented within a header logo component. In some examples, the data manager 215 may implement a listener into the history object. This listener may monitor for location changes and the nature of these changes. In particular, the listener may determine whether the changes to an object is a "PUSH" type of change or a "REPLACE" type of change. In some examples, the data collection and storage infrastructure may collect the data for the navigation history, including a room that a webpage belongs to, a uniform resource locator associated with the webpage, and a document title, among others. In some examples, the data collection and storage infrastructure may store the data in the local state in the form of a list. The maximum size of the list is 20. If the list size reaches a maximum, then the data manager 215 may remove the oldest entry prior to adding a new one.

Additionally, or alternatively, the data manager 215 may implement selective tracking. For example, the data manager 215 may exclude some pages (such as pre-login or post-login campaign-type pages) from the navigation history. If a new uniform resource locator differs from a previous one in terms of query parameters, then the data manager 215 may replace an entry corresponding to the previous uniform resource locator instead of adding a new entry to the list.

In some examples, the data manager 215 may be configured to utilize a display component to display the navigation history list at the user device 205. In some examples, when a user hovers over a room icon included in a webpage, a menu displaying a threshold quantity (e.g., last 20 page visits) may be shown to the user. In some examples, each entry in the menu may be or include a link, such that when a user clicks on an entry, they are redirected to the corresponding page. In some examples, upon receiving a click from a user, the data manager 215 may move the clicked entry to the first position in the list, pushing the later entries back, but not removing them.

Figure 3:
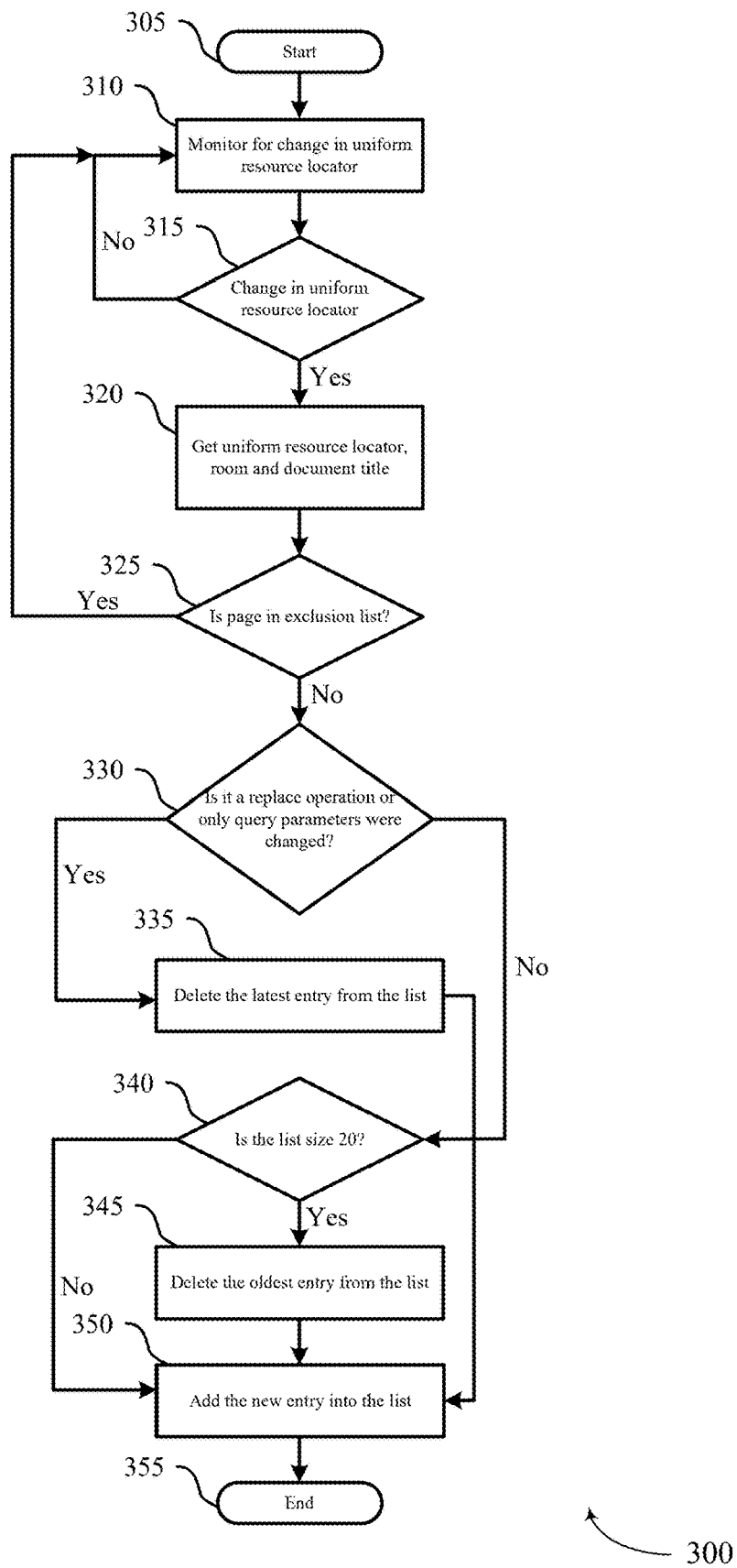
FIG. 3 shows an example of a process flow that supports techniques for navigation history generation in accordance with aspects of the present disclosure.

FIG. 3 shows an example of a process flow 300 that supports techniques for navigation history generation in accordance with aspects of the present disclosure. The process flow 300 may be implemented by a data management platform and a user device, as described with respect to FIG. 2. In some examples, the operations illustrated in the process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 305, the process flow 300 is initiated at the data management platform. At 310, the data management platform may monitor for changes to a uniform resource locator. For example, the data management platform may monitor for request from a user to load a new webpage associated with a new uniform resource locator.

At 315, the data management platform may determine whether there is a change in the uniform resource locator. If the data management platform determines that there is not a change in the uniform resource locator, then the data management platform may continue to monitor for changes to the uniform resource locator. If the data management platform determines that there is a change in the uniform resource locator, then at 320, the data management platform may get uniform resource locator information, room information and document title associated with the newly loaded webpage.

At 325, the data management platform may determine whether the newly loaded webpage is included in an exclusion list. If the webpage is included in the exclusion list, then the data management platform may refrain from making any changes to the navigation list and may continue to monitor for changes to the uniform resource locator. If the webpage is not included in the exclusion list, then at 330, the data management platform may determine whether the intended operation associated with the newly loaded webpage is a replace operation or whether the query parameters were changed.

If the data management platform determines that the intended operation associated with the newly loaded webpage is a replace operation or if the data management platform determines that the query parameters were changed, then the data management platform may delete the latest entry from the list, at 335. If the data management platform determines that the intended operation is not associated with a replace operation and the query parameters were not changed, then at 340, the data management platform determines whether the size of the list is 20.

If the data management platform determines that the size of the list is 20, then at 345, the data management platform deletes the oldest entry from the list and adds the new entry into the list. For instance, the data management platform may maintain a list size of 20, in this example. If the data management platform determines that the size of the list is less than 20, then at 350, the data management platform refrains from deleting the oldest entry and adds the new entry into the list. At 355, the process flow 300 ends.

Figure 4:
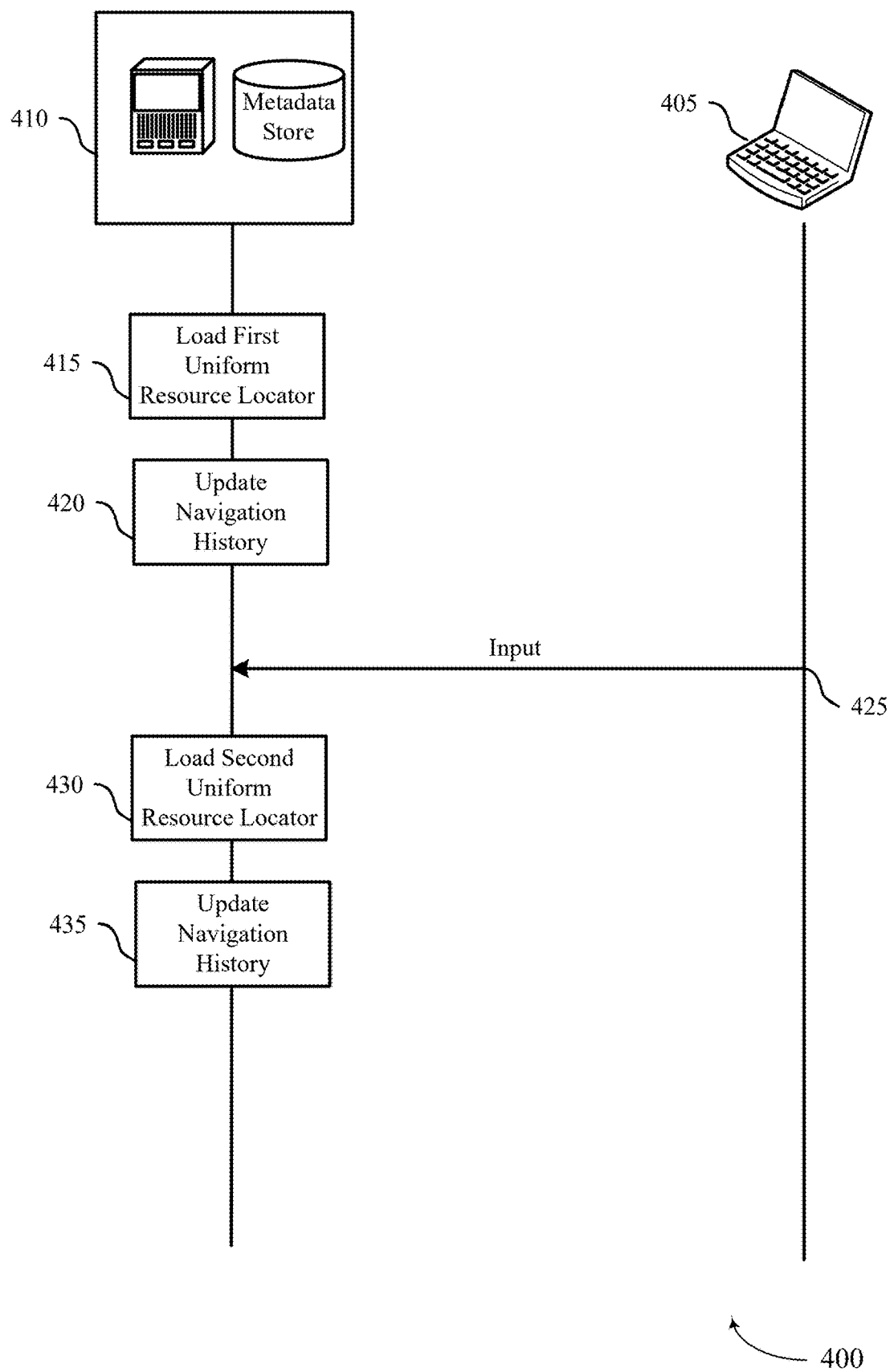
FIG. 4 shows an example of a process flow that supports techniques for navigation history generation in accordance with aspects of the present disclosure.

FIG. 4 shows an example of a process flow 400 that supports techniques for navigation history generation in accordance with aspects of the present disclosure. The process flow 400 includes a data management platform 410 and a user device 405. The data management platform 410 may include an application server and a metadata storage as described with respect to FIG. 2. The user device 405 may include a user device as described with respect to FIG. 2. Although a single entity is depicted as data management platform 410, it may be understood that components of the data management platform 410 may be located in different locations.

In some examples, the operations illustrated in the process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 415, the data management platform 410 may load, in a user interface of an application program, a first uniform resource locator for a webpage configured for an application. In some cases, the webpage may include a set of elements associated with the application and one or more filters corresponding to the set of elements.

At 420, the data management platform 410 may update a navigation history list to include a first entry corresponding to the first uniform resource locator. In some examples, the first entry may be based on a hierarchical location of the first uniform resource locator. At 425, the data management platform 410 may receive, via a user input in the user interface, a selection to apply a filter from the one or more filters to at least one element from the set of elements.

At 430, the data management platform 410 may load, in the user interface of the application program, a second uniform resource locator for the webpage based on receiving the selection to apply the filter. At 435, the data management platform 410 may update the navigation history list to replace the first entry with a second entry corresponding to the second uniform resource locator based on receiving the selection to apply the filter to the at least one element from the set of elements.

Figure 5:
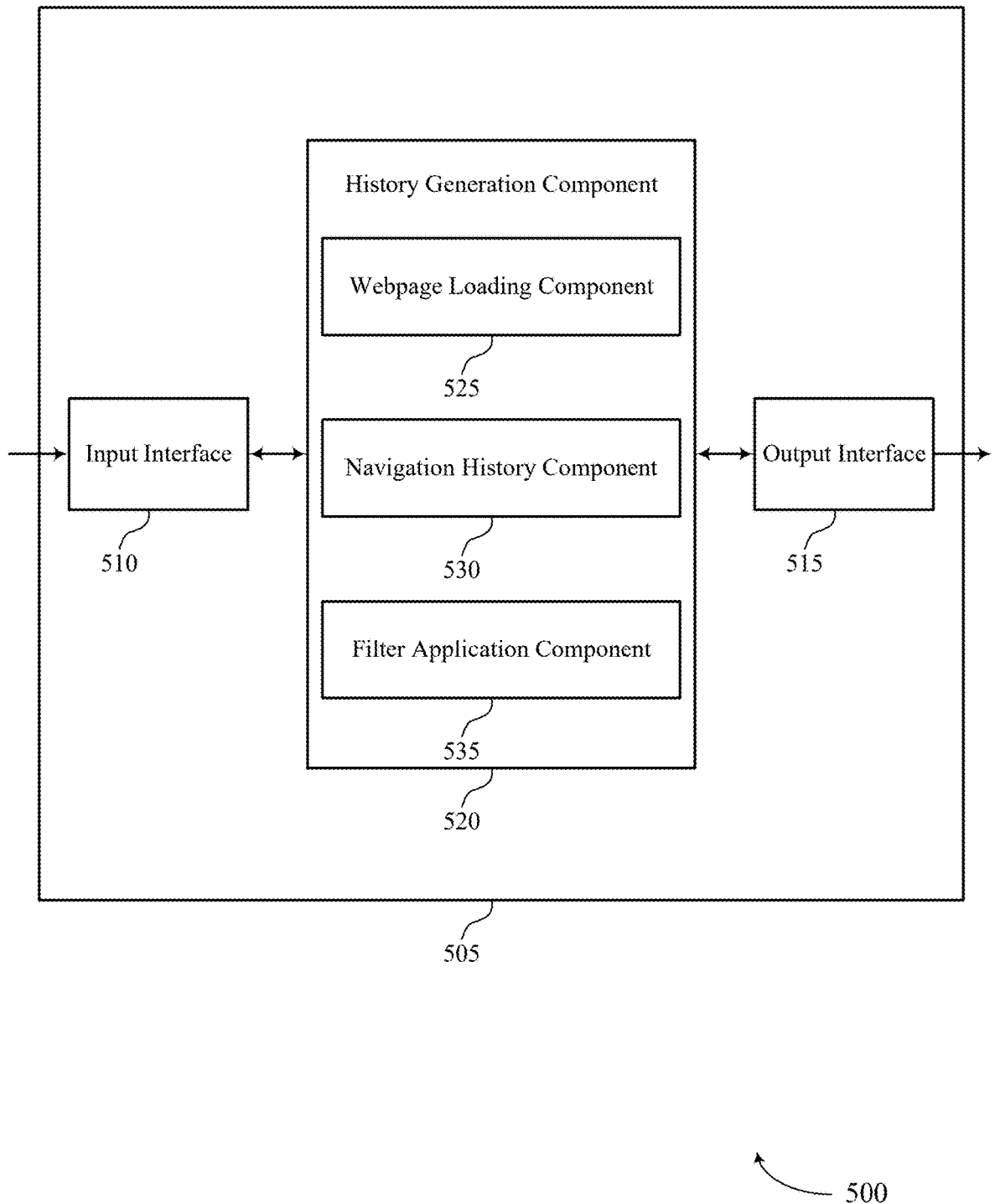
FIG. 5 shows a block diagram of an apparatus that supports techniques for navigation history generation in accordance with aspects of the present disclosure.

FIG. 5 shows a block diagram 500 of a system 505 that supports techniques for navigation history generation in accordance with aspects of the present disclosure. In some examples, the system 505 may be an example of aspects of one or more components described with reference to FIG. 1, such as a DMS 110. The system 505 may include an input interface 510, an output interface 515, and a history generation component 520. The system 505 may also include one or more processors. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the history generation component 520 to support techniques for navigation history generation. In some cases, the input interface 510 may be a component of a network interface 725 as described with reference to FIG. 7.

The output interface 515 may manage output signaling for the system 505. For example, the output interface 515 may receive signaling from other components of the system 505, such as the history generation component 520, and may transmit such output signaling corresponding to (e.g., representative of or otherwise based on) such signaling to other systems or devices. In some cases, the output interface 515 may be a component of a network interface 725 as described with reference to FIG. 7.

For example, the history generation component 520 may include a webpage loading component 525, a navigation history component 530, a filter application component 535, or any combination thereof. In some examples, the history generation component 520, or various components thereof, may be configured to perform various operations (e.g., receiving, monitoring, transmitting) using or otherwise in cooperation with the input interface 510, the output interface 515, or both. For example, the history generation component 520 may receive information from the input interface 510, send information to the output interface 515, or be integrated in combination with the input interface 510, the output interface 515, or both to receive information, transmit information, or perform various other operations as described herein.

The webpage loading component 525 may be configured as or otherwise support a means for loading, in a user interface of an application program, a first uniform resource locator for a webpage configured for an application, where the webpage includes a set of elements associated with the application and one or more filters corresponding to the set of elements. The navigation history component 530 may be configured as or otherwise support a means for updating a navigation history list to include a first entry corresponding to the first uniform resource locator, where the first entry is based on a hierarchical location of the first uniform resource locator. The filter application component 535 may be configured as or otherwise support a means for receiving, via a user input in the user interface, a selection to apply a filter from the one or more filters to at least one element from the set of elements. The webpage loading component 525 may be configured as or otherwise support a means for loading, in the user interface of the application program, a second uniform resource locator for the webpage based on receiving the selection to apply the filter. The navigation history component 530 may be configured as or otherwise support a means for updating the navigation history list to replace the first entry with a second entry corresponding to the second uniform resource locator based on receiving the selection to apply the filter to the at least one element from the set of elements.

Figure 6:
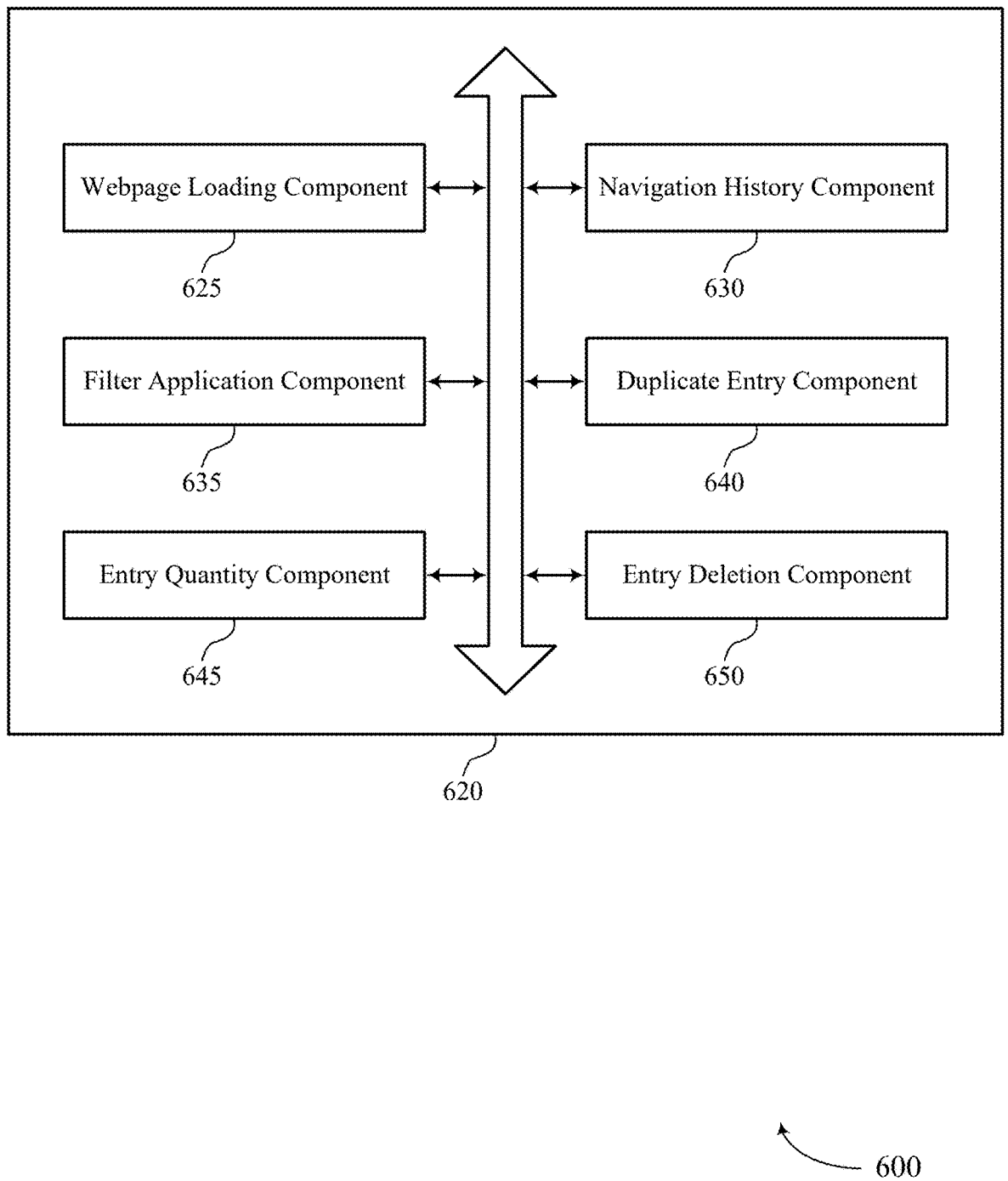
FIG. 6 shows a block diagram of a history generation component that supports techniques for navigation history generation in accordance with aspects of the present disclosure.

FIG. 6 shows a block diagram 600 of a history generation component 620 that supports techniques for navigation history generation in accordance with aspects of the present disclosure. The history generation component 620 may be an example of aspects of a history generation component 520, or both, as described herein. The history generation component 620, or various components thereof, may be an example of means for performing various aspects of techniques for navigation history generation as described herein. For example, the history generation component 620 may include a webpage loading component 625, a navigation history component 630, a filter application component 635, a duplicate entry component 640, an entry quantity component 645, an entry deletion component 650, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The webpage loading component 625 may be configured as or otherwise support a means for loading, in a user interface of an application program, a first uniform resource locator for a webpage configured for an application, where the webpage includes a set of elements associated with the application and one or more filters corresponding to the set of elements. The navigation history component 630 may be configured as or otherwise support a means for updating a navigation history list to include a first entry corresponding to the first uniform resource locator, where the first entry is based on a hierarchical location of the first uniform resource locator. The filter application component 635 may be configured as or otherwise support a means for receiving, via a user input in the user interface, a selection to apply a filter from the one or more filters to at least one element from the set of elements. In some examples, the webpage loading component 625 may be configured as or otherwise support a means for loading, in the user interface of the application program, a second uniform resource locator for the webpage based on receiving the selection to apply the filter. In some examples, the navigation history component 630 may be configured as or otherwise support a means for updating the navigation history list to replace the first entry with a second entry corresponding to the second uniform resource locator based on receiving the selection to apply the filter to the at least one element from the set of elements.

In some examples, the webpage loading component 625 may be configured as or otherwise support a means for loading, in the user interface of the application program, a third uniform resource locator for the webpage, where the third uniform resource locator corresponds to a list of excluded webpages. In some examples, the navigation history component 630 may be configured as or otherwise support a means for refraining from updating the navigation history list with a third entry corresponding to the third uniform resource locator based on the third uniform resource locator corresponding to the list of excluded webpages.

In some examples, the list of excluded webpages include at least one of a pre-login page, a post-login page, or a campaign page. In some examples, the webpage loading component 625 may be configured as or otherwise support a means for loading, in the user interface of the application program, a third uniform resource locator for the webpage. In some examples, the navigation history component 630 may be configured as or otherwise support a means for updating the navigation history list to include a third entry corresponding to the third uniform resource locator, where the third entry is based on a hierarchical location of the third uniform resource locator. In some examples, the second entry and the third entry are unique entries.

In some examples, the duplicate entry component 640 may be configured as or otherwise support a means for determining that second entry and the third entry are duplicate entries, where updating the navigation history list includes updating the navigation history list to replace the second entry with the third entry.

In some examples, the webpage loading component 625 may be configured as or otherwise support a means for reloading, in the user interface of the application program, the second uniform resource locator for the webpage after loading the third uniform resource locator for the webpage. In some examples, the navigation history component 630 may be configured as or otherwise support a means for updating the navigation history list to update a positioning of the third entry and the second entry based on reloading the second uniform resource locator for the webpage.

In some examples, the entry quantity component 645 may be configured as or otherwise support a means for determining that the navigation history list includes a threshold quantity of entries. In some examples, the entry deletion component 650 may be configured as or otherwise support a means for deleting a previous entry from the navigation history list prior to including the third entry corresponding to the third uniform resource locator based on determining that the navigation history list includes the threshold quantity of entries.

In some examples, the one or more filters correspond to one or more query parameters. In some examples, each entry included in the navigation history list includes a link to a corresponding uniform resource locator for the webpage.

Figure 7:
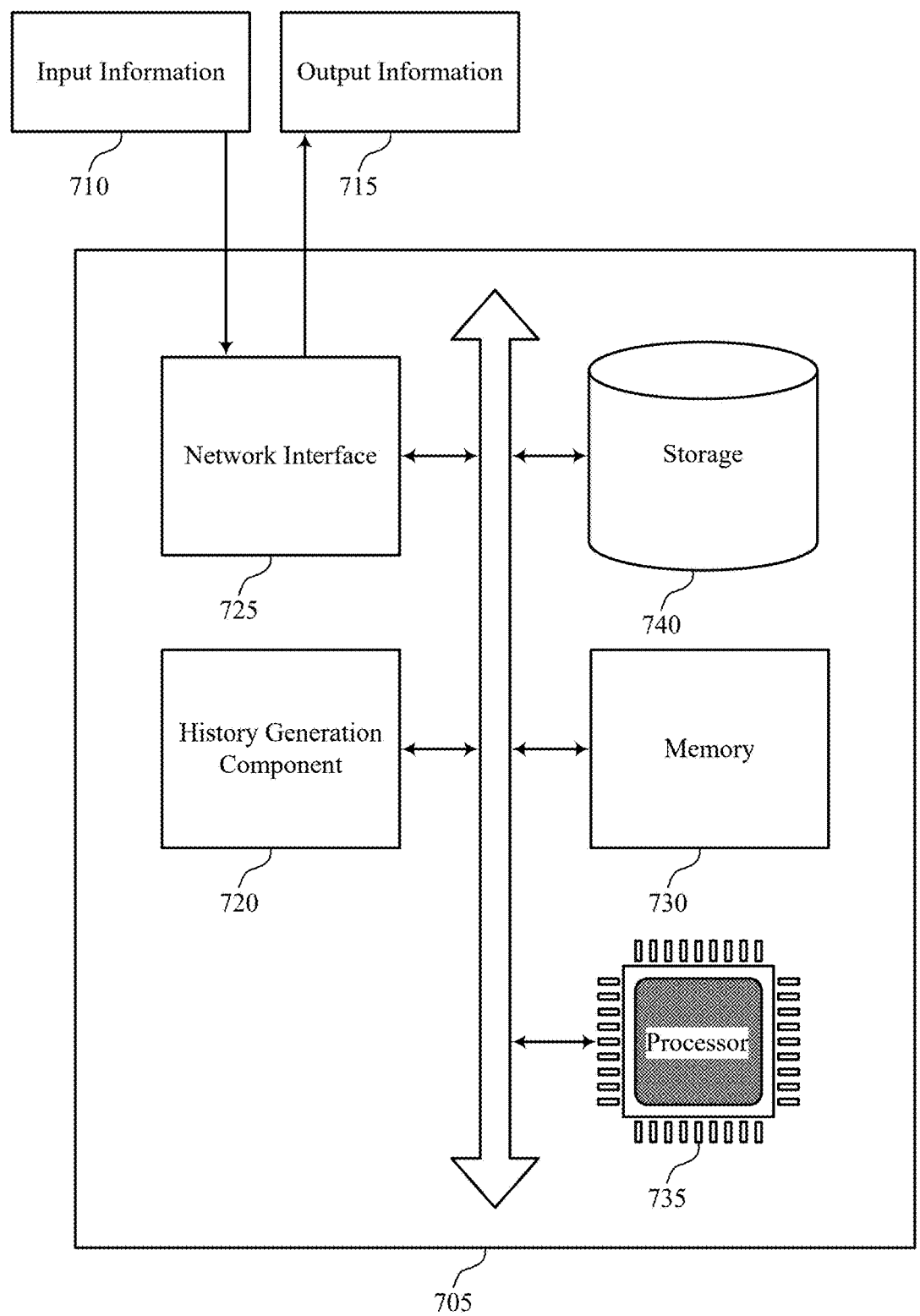
FIG. 7 shows a diagram of a system including a device that supports techniques for navigation history generation in accordance with aspects of the present disclosure.

FIG. 7 shows a block diagram 700 of a system 705 that supports techniques for navigation history generation in accordance with aspects of the present disclosure. The system 705 may be an example of or include components of a system 505 as described herein. The system 705 may include components for data management, including components such as a history generation component 720, an input information 710, an output information 715, a network interface 725, at least one memory 730, at least one processor 735, and a storage 740. These components may be in electronic communication or otherwise coupled with each other (e.g., operatively, communicatively, functionally, electronically, electrically; via one or more buses, communications links, communications interfaces, or any combination thereof). Additionally, the components of the system 705 may include corresponding physical components or may be implemented as corresponding virtual components (e.g., components of one or more virtual machines). In some examples, the system 705 may be an example of aspects of one or more components described with reference to FIG. 1, such as a DMS 110.

The network interface 725 may enable the system 705 to exchange information (e.g., input information 710, output information 715, or both) with other systems or devices (not shown). For example, the network interface 725 may enable the system 705 to connect to a network (e.g., a network 120 as described herein). The network interface 725 may include one or more wireless network interfaces, one or more wired network interfaces, or any combination thereof. In some examples, the network interface 725 may be an example of may be an example of aspects of one or more components described with reference to FIG. 1, such as one or more network interfaces 165.

Memory 730 may include RAM, ROM, or both. The memory 730 may store computer-readable, computer-executable software including instructions that, when executed, cause the processor 735 to perform various functions described herein. In some cases, the memory 730 may contain, among other things, a basic input/output system (BIOS), which may control basic hardware or software operation such as the interaction with peripheral components or devices. In some cases, the memory 730 may be an example of aspects of one or more components described with reference to FIG. 1, such as one or more memories 175.

The processor 735 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 735 may be configured to execute computer-readable instructions stored in a memory 730 to perform various functions (e.g., functions or tasks supporting techniques for navigation history generation). Though a single processor 735 is depicted in the example of FIG. 7, it is to be understood that the system 705 may include any quantity of one or more of processors 735 and that a group of processors 735 may collectively perform one or more functions ascribed herein to a processor, such as the processor 735. In some cases, the processor 735 may be an example of aspects of one or more components described with reference to FIG. 1, such as one or more processors 170.

Storage 740 may be configured to store data that is generated, processed, stored, or otherwise used by the system 705. In some cases, the storage 740 may include one or more HDDs, one or more SDDs, or both. In some examples, the storage 740 may be an example of a single database, a distributed database, multiple distributed databases, a data store, a data lake, or an emergency backup database. In some examples, the storage 740 may be an example of one or more components described with reference to FIG. 1, such as one or more network disks 180.

For example, the history generation component 720 may be configured as or otherwise support a means for loading, in a user interface of an application program, a first uniform resource locator for a webpage configuring for an application, where the webpage includes a set of elements associated with the application and one or more filters corresponding to the set of elements. The history generation component 720 may be configured as or otherwise support a means for updating a navigation history list to include a first entry corresponding to the first uniform resource locator, where the first entry is based on a hierarchical location of the first uniform resource locator. The history generation component 720 may be configured as or otherwise support a means for receiving, via a user input in the user interface, a selection to apply a filter from the one or more filters to at least one element from the set of elements. The history generation component 720 may be configured as or otherwise support a means for loading, in the user interface of the application program, a second uniform resource locator for the webpage basing at least in part on receiving the selection to apply the filter. The history generation component 720 may be configured as or otherwise support a means for updating the navigation history list to replace the first entry with a second entry corresponding to the second uniform resource locator based on receiving the selection to apply the filter to the at least one element from the set of elements.

By including or configuring the history generation component 720 in accordance with examples as described herein, the system 705 may support techniques for navigation history generation, which may provide one or more benefits such as, for example, improved reliability, reduced latency, and improved user experience, among other possibilities.

Figure 8:
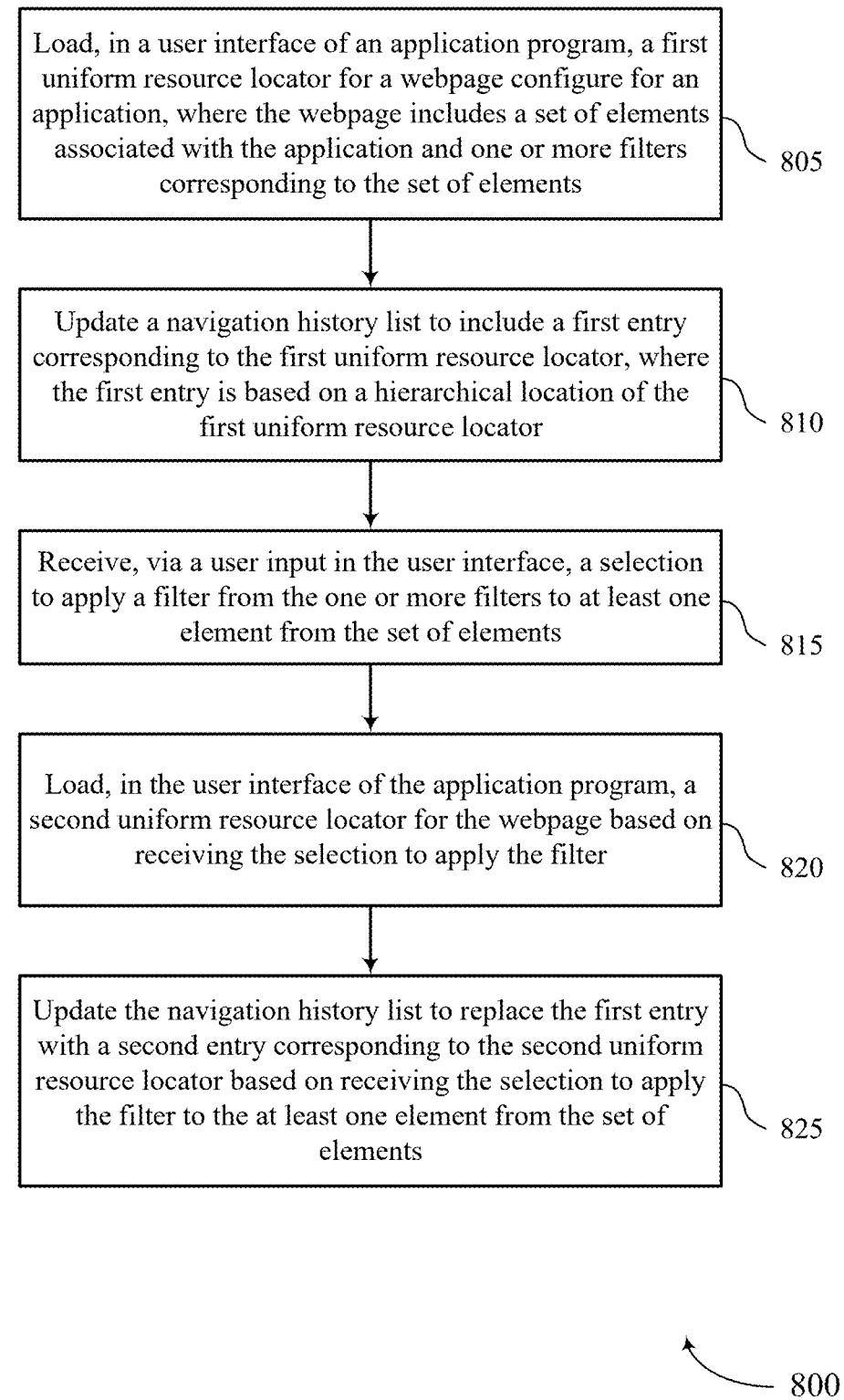
FIGS. 8 through 11 show flowcharts illustrating methods that support techniques for navigation history generation in accordance with aspects of the present disclosure.

FIG. 8 shows a flowchart illustrating a method 800 that supports techniques for navigation history generation in accordance with aspects of the present disclosure. The operations of the method 800 may be implemented by a DMS or its components as described herein. For example, the operations of the method 800 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include loading, in a user interface of an application program, a first uniform resource locator for a webpage configured for an application, where the webpage includes a set of elements associated with the application and one or more filters corresponding to the set of elements. The operations of 805 may be performed in accordance with examples as disclosed herein. In some examples, aspects of the operations of 805 may be performed by a webpage loading component 625 as described with reference to FIG. 6.

At 810, the method may include updating a navigation history list to include a first entry corresponding to the first uniform resource locator, where the first entry is based on a hierarchical location of the first uniform resource locator. The operations of 810 may be performed in accordance with examples as disclosed herein. In some examples, aspects of the operations of 810 may be performed by a navigation history component 630 as described with reference to FIG. 6.

At 815, the method may include receiving, via a user input in the user interface, a selection to apply a filter from the one or more filters to at least one element from the set of elements. The operations of 815 may be performed in accordance with examples as disclosed herein. In some examples, aspects of the operations of 815 may be performed by a filter application component 635 as described with reference to FIG. 6.

At 820, the method may include loading, in the user interface of the application program, a second uniform resource locator for the webpage based on receiving the selection to apply the filter. The operations of 820 may be performed in accordance with examples as disclosed herein. In some examples, aspects of the operations of 820 may be performed by a webpage loading component 625 as described with reference to FIG. 6.

At 825, the method may include updating the navigation history list to replace the first entry with a second entry corresponding to the second uniform resource locator based on receiving the selection to apply the filter to the at least one element from the set of elements. The operations of 825 may be performed in accordance with examples as disclosed herein. In some examples, aspects of the operations of 825 may be performed by a navigation history component 630 as described with reference to FIG. 6.

Figure 9:
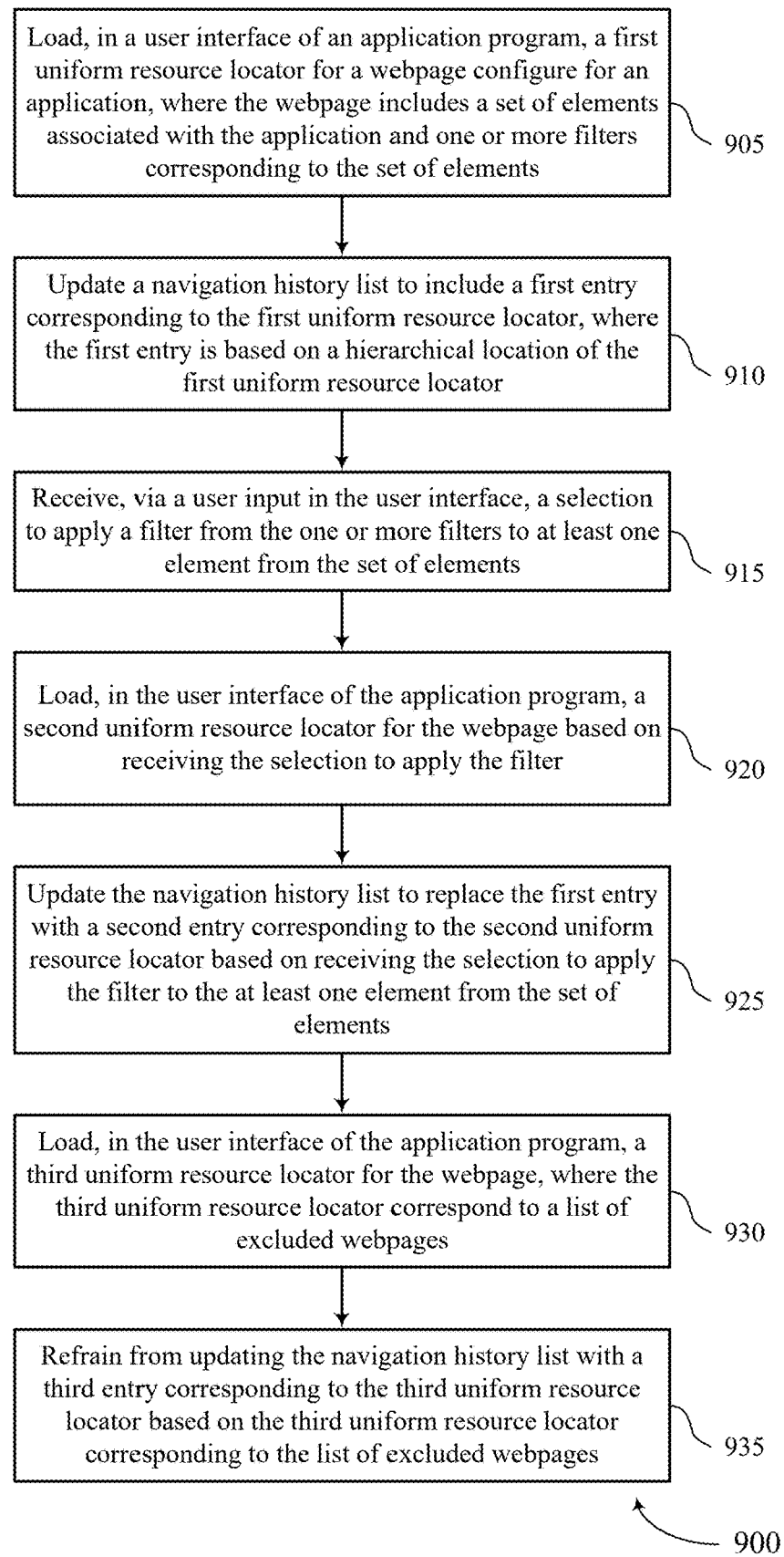

FIG. 9 shows a flowchart illustrating a method 900 that supports techniques for navigation history generation in accordance with aspects of the present disclosure. The operations of the method 900 may be implemented by a DMS or its components as described herein. For example, the operations of the method 900 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 905, the method may include loading, in a user interface of an application program, a first uniform resource locator for a webpage configured for an application, where the webpage includes a set of elements associated with the application and one or more filters corresponding to the set of elements. The operations of 905 may be performed in accordance with examples as disclosed herein. In some examples, aspects of the operations of 905 may be performed by a webpage loading component 625 as described with reference to FIG. 6.

At 910, the method may include updating a navigation history list to include a first entry corresponding to the first uniform resource locator, where the first entry is based on a hierarchical location of the first uniform resource locator. The operations of 910 may be performed in accordance with examples as disclosed herein. In some examples, aspects of the operations of 910 may be performed by a navigation history component 630 as described with reference to FIG. 6.

At 915, the method may include receiving, via a user input in the user interface, a selection to apply a filter from the one or more filters to at least one element from the set of elements. The operations of 915 may be performed in accordance with examples as disclosed herein. In some examples, aspects of the operations of 915 may be performed by a filter application component 635 as described with reference to FIG. 6.

At 920, the method may include loading, in the user interface of the application program, a second uniform resource locator for the webpage based on receiving the selection to apply the filter. The operations of 920 may be performed in accordance with examples as disclosed herein. In some examples, aspects of the operations of 920 may be performed by a webpage loading component 625 as described with reference to FIG. 6.

At 925, the method may include updating the navigation history list to replace the first entry with a second entry corresponding to the second uniform resource locator based on receiving the selection to apply the filter to the at least one element from the set of elements. The operations of 925 may be performed in accordance with examples as disclosed herein. In some examples, aspects of the operations of 925 may be performed by a navigation history component 630 as described with reference to FIG. 6.

At 930, the method may include loading, in the user interface of the application program, a third uniform resource locator for the webpage, where the third uniform resource locator corresponds to a list of excluded webpages. The operations of 930 may be performed in accordance with examples as disclosed herein. In some examples, aspects of the operations of 930 may be performed by a webpage loading component 625 as described with reference to FIG. 6.

At 935, the method may include refraining from updating the navigation history list with a third entry corresponding to the third uniform resource locator based on the third uniform resource locator corresponding to the list of excluded webpages. The operations of 935 may be performed in accordance with examples as disclosed herein. In some examples, aspects of the operations of 935 may be performed by a navigation history component 630 as described with reference to FIG. 6.

Figure 10:
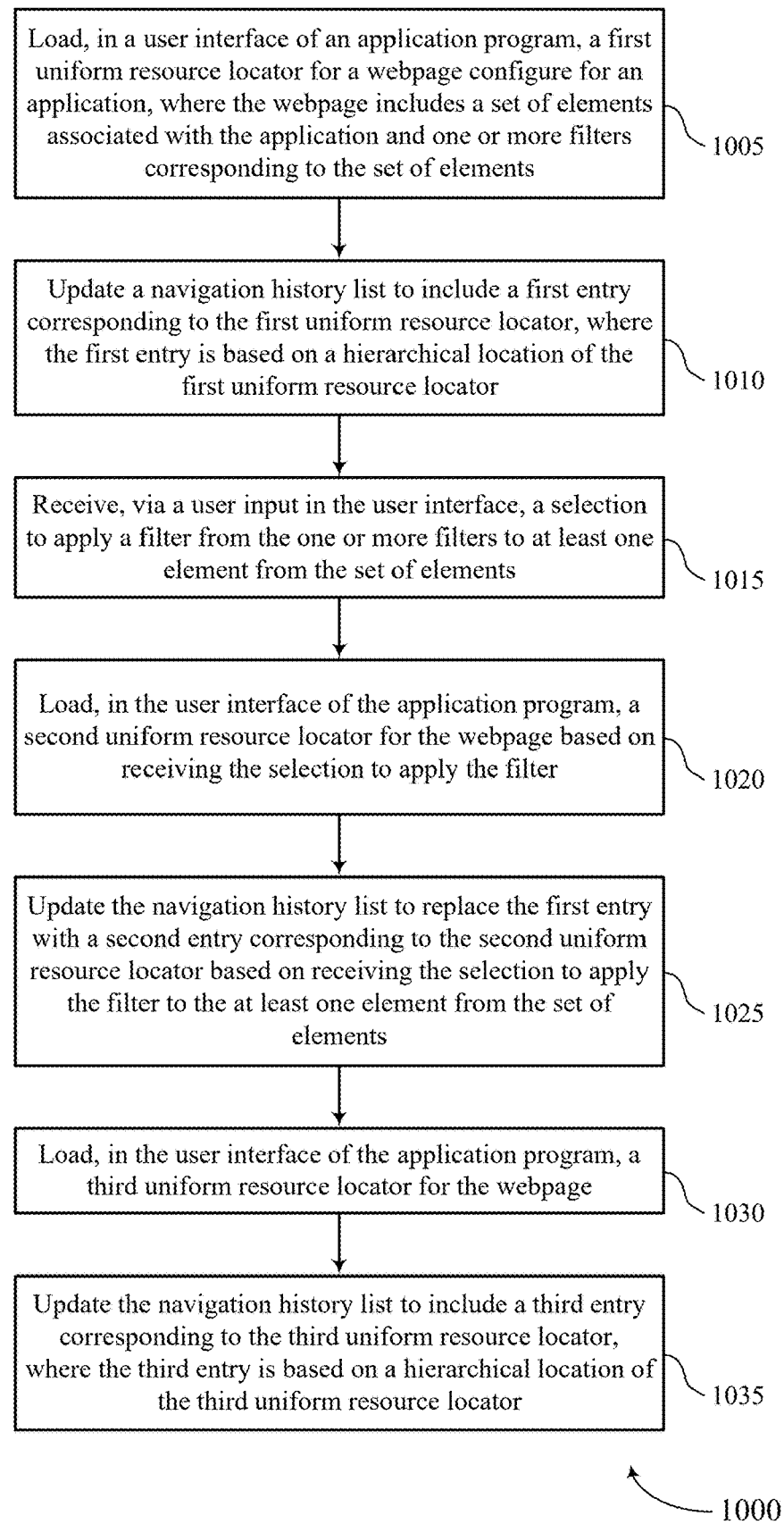

FIG. 10 shows a flowchart illustrating a method 1000 that supports techniques for navigation history generation in accordance with aspects of the present disclosure. The operations of the method 1000 may be implemented by a DMS or its components as described herein. For example, the operations of the method 1000 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 1005, the method may include loading, in a user interface of an application program, a first uniform resource locator for a webpage configured for an application, where the webpage includes a set of elements associated with the application and one or more filters corresponding to the set of elements. The operations of 1005 may be performed in accordance with examples as disclosed herein. In some examples, aspects of the operations of 1005 may be performed by a webpage loading component 625 as described with reference to FIG. 6.

At 1010, the method may include updating a navigation history list to include a first entry corresponding to the first uniform resource locator, where the first entry is based on a hierarchical location of the first uniform resource locator. The operations of 1010 may be performed in accordance with examples as disclosed herein. In some examples, aspects of the operations of 1010 may be performed by a navigation history component 630 as described with reference to FIG. 6.

At 1015, the method may include receiving, via a user input in the user interface, a selection to apply a filter from the one or more filters to at least one element from the set of elements. The operations of 1015 may be performed in accordance with examples as disclosed herein. In some examples, aspects of the operations of 1015 may be performed by a filter application component 635 as described with reference to FIG. 6.

At 1020, the method may include loading, in the user interface of the application program, a second uniform resource locator for the webpage based on receiving the selection to apply the filter. The operations of 1020 may be performed in accordance with examples as disclosed herein. In some examples, aspects of the operations of 1020 may be performed by a webpage loading component 625 as described with reference to FIG. 6.

At 1025, the method may include updating the navigation history list to replace the first entry with a second entry corresponding to the second uniform resource locator based on receiving the selection to apply the filter to the at least one element from the set of elements. The operations of 1025 may be performed in accordance with examples as disclosed herein. In some examples, aspects of the operations of 1025 may be performed by a navigation history component 630 as described with reference to FIG. 6.

At 1030, the method may include loading, in the user interface of the application program, a third uniform resource locator for the webpage. The operations of 1030 may be performed in accordance with examples as disclosed herein. In some examples, aspects of the operations of 1030 may be performed by a webpage loading component 625 as described with reference to FIG. 6.

At 1035, the method may include updating the navigation history list to include a third entry corresponding to the third uniform resource locator, where the third entry is based on a hierarchical location of the third uniform resource locator. The operations of 1035 may be performed in accordance with examples as disclosed herein. In some examples, aspects of the operations of 1035 may be performed by a navigation history component 630 as described with reference to FIG. 6.

Figure 11:
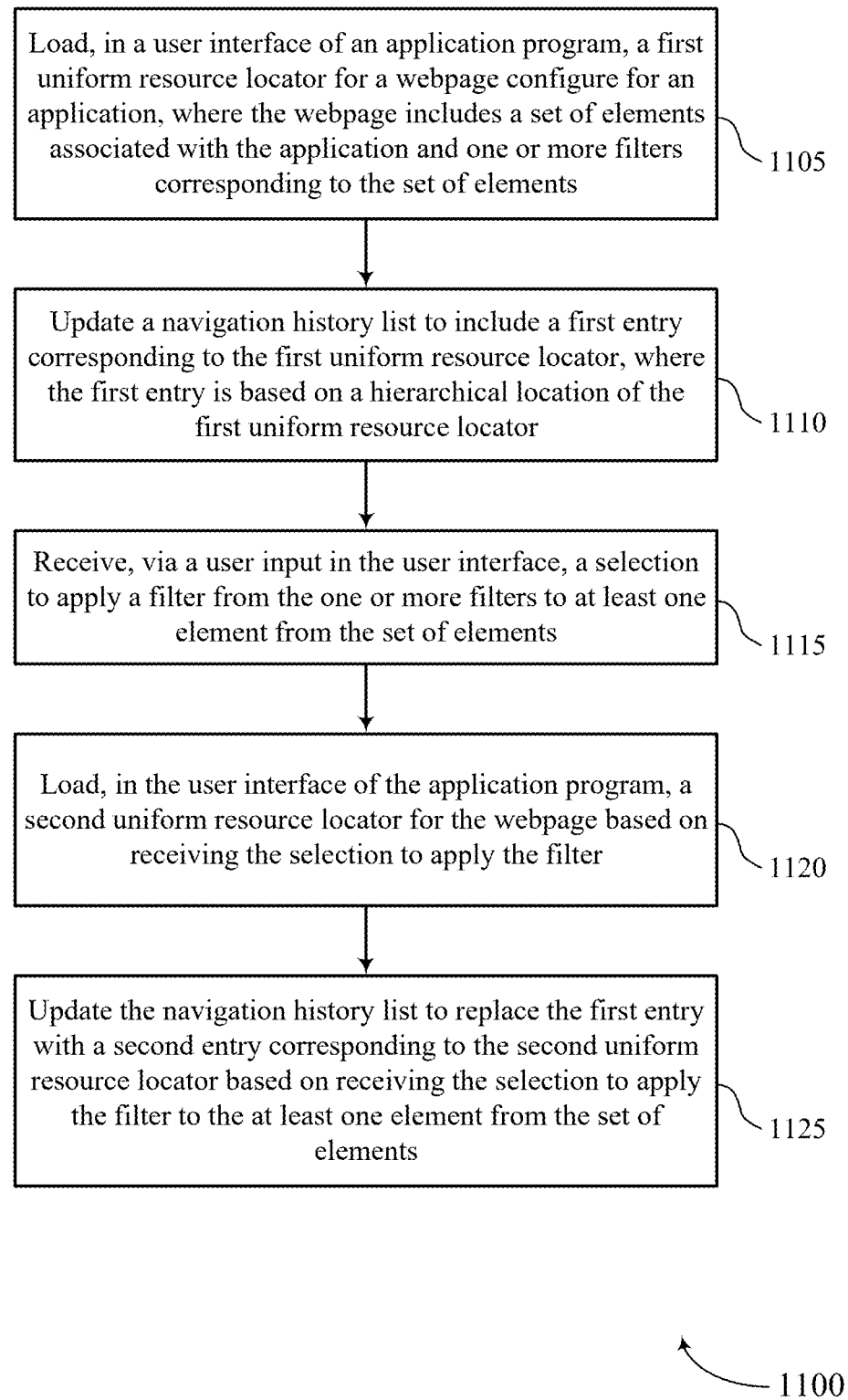

FIG. 11 shows a flowchart illustrating a method 1100 that supports techniques for navigation history generation in accordance with aspects of the present disclosure. The operations of the method 1100 may be implemented by a DMS or its components as described herein. For example, the operations of the method 1100 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 1105, the method may include loading, in a user interface of an application program, a first uniform resource locator for a webpage configured for an application, where the webpage includes a set of elements associated with the application and one or more filters corresponding to the set of elements. The operations of 1105 may be performed in accordance with examples as disclosed herein. In some examples, aspects of the operations of 1105 may be performed by a webpage loading component 625 as described with reference to FIG. 6.

At 1110, the method may include updating a navigation history list to include a first entry corresponding to the first uniform resource locator, where the first entry is based on a hierarchical location of the first uniform resource locator. The operations of 1110 may be performed in accordance with examples as disclosed herein. In some examples, aspects of the operations of 1110 may be performed by a navigation history component 630 as described with reference to FIG. 6.

At 1115, the method may include receiving, via a user input in the user interface, a selection to apply a filter from the one or more filters to at least one element from the set of elements. The operations of 1115 may be performed in accordance with examples as disclosed herein. In some examples, aspects of the operations of 1115 may be performed by a filter application component 635 as described with reference to FIG. 6.

At 1120, the method may include loading, in the user interface of the application program, a second uniform resource locator for the webpage based on receiving the selection to apply the filter. The operations of 1120 may be performed in accordance with examples as disclosed herein. In some examples, aspects of the operations of 1120 may be performed by a webpage loading component 625 as described with reference to FIG. 6.

At 1125, the method may include updating the navigation history list to replace the first entry with a second entry corresponding to the second uniform resource locator based on receiving the selection to apply the filter to the at least one element from the set of elements. The operations of 1125 may be performed in accordance with examples as disclosed herein. In some examples, aspects of the operations of 1125 may be performed by a navigation history component 630 as described with reference to FIG. 6.

A method by an apparatus is described. The method may include loading, in a user interface of an application program, a first uniform resource locator for a webpage configured for an application, where the webpage includes a set of elements associated with the application and one or more filters corresponding to the set of elements, updating a navigation history list to include a first entry corresponding to the first uniform resource locator, where the first entry is based on a hierarchical location of the first uniform resource locator, receiving, via a user input in the user interface, a selection to apply a filter from the one or more filters to at least one element from the set of elements, loading, in the user interface of the application program, a second uniform resource locator for the webpage based on receiving the selection to apply the filter, and updating the navigation history list to replace the first entry with a second entry corresponding to the second uniform resource locator based on receiving the selection to apply the filter to the at least one element from the set of elements.

An apparatus is described. The apparatus may include one or more memories storing processor executable code, and one or more processors coupled with the one or more memories. The one or more processors may individually or collectively be operable to execute the code to cause the apparatus to loading, in a user interface of an application program, a first uniform resource locator for a webpage configure for an application, where the webpage includes a set of elements associated with the application and one or more filters corresponding to the set of elements, update a navigation history list to include a first entry corresponding to the first uniform resource locator, where the first entry is based on a hierarchical location of the first uniform resource locator, receive, via a user input in the user interface, a selection to apply a filter from the one or more filters to at least one element from the set of elements, loading, in the user interface of the application program, a second uniform resource locator for the webpage based at least in part on receiving the selection to apply the filter, and update the navigation history list to replace the first entry with a second entry corresponding to the second uniform resource locator based on receiving the selection to apply the filter to the at least one element from the set of elements.

Another apparatus is described. The apparatus may include means for loading, in a user interface of an application program, a first uniform resource locator for a webpage configured for an application, where the webpage includes a set of elements associated with the application and one or more filters corresponding to the set of elements, means for updating a navigation history list to include a first entry corresponding to the first uniform resource locator, where the first entry is based on a hierarchical location of the first uniform resource locator, means for receiving, via a user input in the user interface, a selection to apply a filter from the one or more filters to at least one element from the set of elements, means for loading, in the user interface of the application program, a second uniform resource locator for the webpage based on receiving the selection to apply the filter, and means for updating the navigation history list to replace the first entry with a second entry corresponding to the second uniform resource locator based on receiving the selection to apply the filter to the at least one element from the set of elements.

A non-transitory computer-readable medium storing code is described. The code may include instructions executable by one or more processors to loading, in a user interface of an application program, a first uniform resource locator for a webpage configure for an application, where the webpage includes a set of elements associated with the application and one or more filters corresponding to the set of elements, update a navigation history list to include a first entry corresponding to the first uniform resource locator, where the first entry is based on a hierarchical location of the first uniform resource locator, receive, via a user input in the user interface, a selection to apply a filter from the one or more filters to at least one element from the set of elements, loading, in the user interface of the application program, a second uniform resource locator for the webpage based at least in part on receiving the selection to apply the filter, and update the navigation history list to replace the first entry with a second entry corresponding to the second uniform resource locator based on receiving the selection to apply the filter to the at least one element from the set of elements.

In some examples of the method, apparatus, and non-transitory computer-readable medium described herein, loading, in the user interface of the application program, a third uniform resource locator for the webpage, where the third uniform resource locator corresponds to a list of excluded webpages and refraining from updating the navigation history list with a third entry corresponding to the third uniform resource locator based on the third uniform resource locator corresponding to the list of excluded webpages.

In some examples of the method, apparatus, and non-transitory computer-readable medium described herein, the list of excluded webpages include at least one of a pre-login page, a post-login page, or a campaign page.

In some examples of the method, apparatus, and non-transitory computer-readable medium described herein, loading, in the user interface of the application program, a third uniform resource locator for the webpage and updating the navigation history list to include a third entry corresponding to the third uniform resource locator, where the third entry may be based on a hierarchical location of the third uniform resource locator.

In some examples of the method, apparatus, and non-transitory computer-readable medium described herein, the second entry and the third entry may be unique entries.

Some examples of the method, apparatus, and non-transitory computer-readable medium described herein may further include operations, features, means, or instructions for determining that second entry and the third entry may be duplicate entries, where updating the navigation history list includes updating the navigation history list to replace the second entry with the third entry.

Some examples of the method, apparatus, and non-transitory computer-readable medium described herein may further include operations, features, means, or instructions for reloading, in the user interface of the application program, the second uniform resource locator for the webpage after loading the third uniform resource locator for the webpage and updating the navigation history list to update a positioning of the third entry and the second entry based on reloading the second uniform resource locator for the webpage.

Some examples of the method, apparatus, and non-transitory computer-readable medium described herein may further include operations, features, means, or instructions for determining that the navigation history list includes a threshold quantity of entries and deleting a previous entry from the navigation history list prior to including the third entry corresponding to the third uniform resource locator based on determining that the navigation history list includes the threshold quantity of entries.

In some examples of the method, apparatus, and non-transitory computer-readable medium described herein, the one or more filters correspond to one or more query parameters.

In some examples of the method, apparatus, and non-transitory computer-readable medium described herein, each entry included in the navigation history list includes a link to a corresponding uniform resource locator for the webpage.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
    loading, in a user interface of an application program, a first uniform resource locator for a webpage configured for an application, wherein the webpage comprises a set of elements associated with the application and one or more filters corresponding to one or more query parameters associated with the set of elements;
    updating a navigation history list to include a first entry corresponding to the first uniform resource locator, wherein the first entry is based at least in part on a hierarchical location of the first uniform resource locator;
    receiving, via a user input in the user interface, a selection to apply a filter from the one or more filters to at least one element from the set of elements, wherein the user input results in a change to a query parameter of the one or more query parameters associated with the set of elements;
    loading, in the user interface of the application program, a second uniform resource locator for the webpage based at least in part on receiving the selection to apply the filter, wherein the second uniform resource locator is associated with the change to the query parameter; and
    updating the navigation history list to replace the first entry with a second entry corresponding to the second uniform resource locator based at least in part on receiving the selection to apply the filter to the at least one element from the set of elements and the change to the query parameter.

2. The method of claim 1, further comprising:
    loading, in the user interface of the application program, a third uniform resource locator for the webpage, wherein the third uniform resource locator corresponds to a list of excluded webpages; and
    refraining from updating the navigation history list with a third entry corresponding to the third uniform resource locator based at least in part on the third uniform resource locator corresponding to the list of excluded webpages.

3. The method of claim 2, wherein the list of excluded webpages include at least one of a pre-login page, a post-login page, or a campaign page.

4. The method of claim 1, further comprising:
    loading, in the user interface of the application program, a third uniform resource locator for the webpage; and
    updating the navigation history list to include a third entry corresponding to the third uniform resource locator, wherein the third entry is based at least in part on a hierarchical location of the third uniform resource locator.

5. The method of claim 4, wherein the second entry and the third entry are unique entries.

6. The method of claim 4, further comprising:
    determining that second entry and the third entry are duplicate entries, wherein updating the navigation history list comprises updating the navigation history list to replace the second entry with the third entry.

7. The method of claim 4, further comprising:
reloading, in the user interface of the application program, the second uniform resource locator for the webpage after loading the third uniform resource locator for the webpage; and
updating the navigation history list to update a positioning of the third entry and the second entry based at least in part on reloading the second uniform resource locator for the webpage.

8. The method of claim 4, further comprising:
determining that the navigation history list comprises a threshold quantity of entries; and
deleting a previous entry from the navigation history list prior to including the third entry corresponding to the third uniform resource locator based at least in part on determining that the navigation history list comprises the threshold quantity of entries.

9. The method of claim 1, wherein each entry included in the navigation history list comprises a link to a corresponding uniform resource locator for the webpage.

10. An apparatus, comprising:
one or more memories storing processor-executable code; and
one or more processors coupled with the one or more memories and individually or collectively operable to execute the code to cause the apparatus to:
load in a user interface of an application program, a first uniform resource locator for a webpage configured for an application, wherein the webpage comprises a set of elements associated with the application and one or more filters corresponding to one or more query parameters associated with the set of elements;
update a navigation history list to include a first entry corresponding to the first uniform resource locator, wherein the first entry is based at least in part on a hierarchical location of the first uniform resource locator;
receive, via a user input in the user interface, a selection to apply a filter from the one or more filters to at least one element from the set of elements, wherein the user input results in a change to a query parameter of the one or more query parameters associated with the set of elements;
load, in the user interface of the application program, a second uniform resource locator for the webpage based at least in part on receiving the selection to apply the filter, wherein the second uniform resource locator is associated with the change to the query parameter; and
update the navigation history list to replace the first entry with a second entry corresponding to the second uniform resource locator based at least in part on receiving the selection to apply the filter to the at least one element from the set of elements and the change to the query parameter.

11. The apparatus of claim 10, wherein the one or more processors are individually or collectively further operable to execute the code to cause the apparatus to:
load, in the user interface of the application program, a third uniform resource locator for the webpage, wherein the third uniform resource locator correspond to a list of excluded webpages; and
refrain from updating the navigation history list with a third entry corresponding to the third uniform resource locator based at least in part on the third uniform resource locator corresponding to the list of excluded webpages.

12. The apparatus of claim 11, wherein the list of excluded webpages include at least one of a pre-login page, a post-login page, or a campaign page.

13. The apparatus of claim 10, wherein the one or more processors are individually or collectively further operable to execute the code to cause the apparatus to:
load, in the user interface of the application program, a third uniform resource locator for the webpage; and
update the navigation history list to include a third entry corresponding to the third uniform resource locator, wherein the third entry is based at least in part on a hierarchical location of the third uniform resource locator.

14. The apparatus of claim 13, wherein the second entry and the third entry are unique entries.

15. The apparatus of claim 13, wherein the one or more processors are individually or collectively further operable to execute the code to cause the apparatus to:
determine that second entry and the third entry are duplicate entries, wherein updating the navigation history list comprises updating the navigation history list to replace the second entry with the third entry.

16. The apparatus of claim 13, wherein the one or more processors are individually or collectively further operable to execute the code to cause the apparatus to:
reload, in the user interface of the application program, the second uniform resource locator for the webpage after loading the third uniform resource locator for the webpage; and
update the navigation history list to update a positioning of the third entry and the second entry based at least in part on reloading the second uniform resource locator for the webpage.

17. The apparatus of claim 13, wherein the one or more processors are individually or collectively further operable to execute the code to cause the apparatus to:
determine that the navigation history list comprises a threshold quantity of entries; and
delete a previous entry from the navigation history list prior to including the third entry corresponding to the third uniform resource locator based at least in part on determining that the navigation history list comprises the threshold quantity of entries.

18. A non-transitory computer-readable medium storing code, the code comprising instructions executable by one or more processors to:
load, in a user interface of an application program, a first uniform resource locator for a webpage configured for an application, wherein the webpage comprises a set of elements associated with the application and one or more filters corresponding to one or more query parameters associated with the set of elements;
update a navigation history list to include a first entry corresponding to the first uniform resource locator, wherein the first entry is based at least in part on a hierarchical location of the first uniform resource locator;
receive, via a user input in the user interface, a selection to apply a filter from the one or more filters to at least one element from the set of elements, wherein the user input results in a change to a query parameter of the one or more query parameters associated with the set of elements;

load, in the user interface of the application program, a second uniform resource locator for the webpage based at least in part on receiving the selection to apply the filter, wherein the second uniform resource locator is associated with the change to the query parameter; and
update the navigation history list to replace the first entry with a second entry corresponding to the second uniform resource locator based at least in part on receiving the selection to apply the filter to the at least one element from the set of elements and the change to the query parameter.

* * * * *